(12) United States Patent
De Saint-Romain

(10) Patent No.: US 9,850,392 B2
(45) Date of Patent: Dec. 26, 2017

(54) INK COMPOSITION FOR LIQUID JET PRINTING

(71) Applicant: Markem-Imaje Holding, Bourg-les-valence (FR)

(72) Inventor: Pierre De Saint-Romain, Valence (FR)

(73) Assignee: MARKEM-IMAJE HOLDING, Bourg-les-Valence (FR)

( * ) Notice: Subject to any disclaimer, the term of this patent is extended or adjusted under 35 U.S.C. 154(b) by 0 days.

(21) Appl. No.: 14/763,927

(22) PCT Filed: Jan. 31, 2014

(86) PCT No.: PCT/EP2014/051929
§ 371 (c)(1),
(2) Date: Jul. 28, 2015

(87) PCT Pub. No.: WO2014/118330
PCT Pub. Date: Aug. 7, 2014

(65) Prior Publication Data
US 2015/0368486 A1    Dec. 24, 2015

(30) Foreign Application Priority Data

Feb. 1, 2013  (FR) ..................... 13 50883

(51) Int. Cl.
| | | |
|---|---|---|
| *C09D 11/106* | (2014.01) | |
| *C09D 11/34* | (2014.01) | |
| *C09D 11/36* | (2014.01) | |
| *C09D 11/52* | (2014.01) | |
| *B41J 2/21* | (2006.01) | |
| *C09D 11/322* | (2014.01) | |
| *C09D 11/324* | (2014.01) | |
| *C09D 11/328* | (2014.01) | |

(52) U.S. Cl.
CPC .......... *C09D 11/106* (2013.01); *B41J 2/2107* (2013.01); *C09D 11/322* (2013.01); *C09D 11/324* (2013.01); *C09D 11/328* (2013.01); *C09D 11/34* (2013.01); *C09D 11/36* (2013.01); *C09D 11/52* (2013.01); *Y10T 428/24802* (2015.01); *Y10T 428/24901* (2015.01); *Y10T 428/24917* (2015.01); *Y10T 428/24926* (2015.01); *Y10T 428/24934* (2015.01)

(58) Field of Classification Search
CPC ........ C09D 11/34; C09D 11/36; C09D 11/106
USPC ....................................................... 523/160
See application file for complete search history.

(56) References Cited

U.S. PATENT DOCUMENTS

| | | | |
|---|---|---|---|
| 3,287,308 A | 11/1966 | Whyzmuzis et al. | |
| 3,300,435 A | 1/1967 | Ueda et al. | |
| 3,632,543 A | 1/1972 | Nakanome et al. | |
| 4,153,593 A | 5/1979 | Zabiak | |
| 4,155,767 A | 5/1979 | Specht | |
| 4,260,531 A | 4/1981 | Wachtel | |
| 4,465,800 A | 8/1984 | Bhatia | |
| 4,471,079 A | 9/1984 | Enami | |
| 4,567,213 A | 1/1986 | Bhatia | |
| 4,756,758 A | 7/1988 | Lent | |
| 4,834,799 A | 5/1989 | Song | |
| 4,877,512 A * | 10/1989 | Bowns | C08K 3/08 204/291 |
| 4,880,465 A | 11/1989 | Loria | |
| 5,102,458 A | 4/1992 | Lent | |
| 5,316,575 A | 5/1994 | Lent | |
| 5,395,431 A | 3/1995 | Siddiqui | |
| 5,395,432 A | 3/1995 | Nelson | |
| 5,594,044 A | 1/1997 | Yang | |
| 5,637,139 A | 6/1997 | Morelos | |
| 5,908,495 A | 6/1999 | Nohr | |
| 5,954,866 A | 9/1999 | Ohta | |
| 6,221,933 B1 | 4/2001 | Zhu | |
| 6,869,986 B1 * | 3/2005 | Millot | C09D 11/36 523/160 |
| 7,132,464 B2 | 11/2006 | Nakamura | |

(Continued)

FOREIGN PATENT DOCUMENTS

| | | |
|---|---|---|
| CN | 102161848 A | 8/2011 |
| EP | 0 289 141 A2 | 11/1988 |

(Continued)

OTHER PUBLICATIONS

Search Report issued in French Patent Application No. FR 13 50883 dated Oct. 15, 2013.
International Search Report issued in Application No. PCT/EP2014/051929 dated Mar. 27, 2014.
Written Opinion issued in Application No. PCT/EP2014/051929 dated Mar. 27, 2014.

(Continued)

*Primary Examiner* — Vu A Nguyen
(74) *Attorney, Agent, or Firm* — Pearne & Gordon LLP

(57) ABSTRACT

Non-aqueous ink composition for liquid ink jet printing including: a vehicle comprising one or more organic solvent(s) liquid at ambient temperature, or one or more organic compound(s) solid at ambient temperature and liquid at the projection temperature; one or more dye(s) and/or pigment(s); a binder, comprising at least one binding resin consisting of a copolymer of vinylidene chloride and of at least one other monomer, in solution at ambient temperature in the organic solvent(s) or in solution at the projection temperature in the organic compound(s). A method for marking substrates, supports or objects includes projection onto the substrates, supports or objects of the ink composition by a liquid ink jet printing technique. A substrate, support or object, particularly flexible substrate, is provided with a marking obtained by drying and/or absorption of the composition.

33 Claims, No Drawings

(56) References Cited

U.S. PATENT DOCUMENTS

| | | | |
|---|---|---|---|
| 7,598,301 | B2 | 10/2009 | Hanmura |
| 7,638,561 | B2 | 12/2009 | Fu |
| 7,897,655 | B2 | 3/2011 | Yau |
| 2002/0195584 | A1 | 12/2002 | Nielsen |
| 2003/0101902 | A1 | 6/2003 | Reitnauer et al. |
| 2008/0097005 | A1* | 4/2008 | Shiotani ................ C09D 11/30 523/160 |
| 2011/0009537 | A1 | 1/2011 | Kotera |
| 2014/0050868 | A1 | 2/2014 | De Saint-Romain |
| 2014/0065381 | A1 | 3/2014 | De Saint Romain |

FOREIGN PATENT DOCUMENTS

| | | |
|---|---|---|
| EP | 0 510 752 A1 | 10/1992 |
| EP | 0 735 120 A2 | 10/1996 |
| EP | 2 157 143 A1 | 2/2010 |
| GB | 2 286 402 A | 8/1995 |
| GB | 2 298 713 A | 9/1996 |
| WO | 92/14794 A1 | 9/1992 |
| WO | 92/14795 A1 | 9/1992 |
| WO | 94/04619 A1 | 3/1994 |
| WO | 95/29287 A1 | 11/1995 |
| WO | 96/23844 A1 | 8/1996 |
| WO | 00/64681 A1 | 11/2000 |

OTHER PUBLICATIONS

"Vinylidene Chloride Monomer and Ploymers: A Technical Report on VDC and PCDC", Kirk-Othmer: Encyclopedia of Chemical Technology, Fourth Edition, 1997, pp. 882-923, vol. 24, John Wiley & Sons, Inc., New York.
Communication of a notice of opposition by the European Patent Office for European Pat. No. 14701796.6 dated Aug. 9, 2017.

\* cited by examiner

INK COMPOSITION FOR LIQUID JET PRINTING

The invention relates to an ink composition for the marking of supports and objects of all kinds, the properties of which are particularly well suited to liquid jet marking or printing, known as "ink jet" printing or marking, of a very large variety of supports, substrates and objects, and particularly of flexible supports, substrates and objects.

Ink jet printing is a well-known technique that enables the printing, the marking, or the decoration of all kinds of objects, at high speed, and without contact of said objects with the printing device, of messages that can be varied at will, such as bar codes, sell by dates, etc., even on non-planar supports.

Ink jet printing systems may be divided into two major types: DOD (drop on demand) or CIJ (continuous ink jet).

"Drop on demand" jet spraying, printing, projection may be carried out by what is known as "bubble" ink jet, by what is known as "piezoelectric" ink jet, by what is known as "valve" ink jet or finally by what is known as "hot melt" or phase change ink jet.

In the case of bubble ink jet, the ink is vaporised in the vicinity of the nozzle and said vaporisation causes the ejection of the small quantity of ink situated between the resistance that vaporises the ink and the nozzle. In the case of piezoelectric ink jet, a sharp pressure variation brought about by an actuator made to move by the electrical excitation of a crystal or a piezoelectric crystal and situated in the vicinity of the nozzle causes the ejection of an ink drop.

In the case of "hot melt" ink jet, the ink is solvent free and it is heated to above its melting point.

Drop on demand printing may thus be carried out at ambient temperature, which is the case of piezoelectric ink jet, valve ink jet or bubble ink jet, or at high temperature, for example at around 60° C. to 130° C., which is the case of what is known as "Hot Melt" (HM) or phase change ink jet.

Continuous deflected ink jet spraying, printing, projection consists in sending under pressure ink in a cavity containing a piezoelectric crystal, from where the ink escapes through an orifice (nozzle) in the form of a jet. The piezoelectric crystal, vibrating at a determined frequency, causes pressure perturbations in the ink jet, which oscillates and breaks up progressively into spherical droplets. An electrode, known as "charge electrode", placed in the path of the jet, at the spot where it breaks, makes it possible to give an electrostatic charge to said drops, if the ink is conductive. The drops thereby charged are deflected in an electric field and enable printing.

For all types of ink jet technology, the viscosity of the inks is very low at the projection temperature, typically from 1 to 20 cPs, and these technologies may thus be qualified as technologies of depositing low viscosity ink.

The projection of ink by jet assures marking without contact at high production line speed on objects that are not necessarily planar, flat and with the possibility of changing the message at will.

Ink compositions, suitable for projection by jet, need to satisfy a certain number of criteria inherent in this technique, relating, among other things, to the viscosity, the solubility in a solvent for cleaning, the compatibility of the ingredients, the correct wetting of the supports to be marked, etc., and electrical conductivity in the case of continuous deflected ink jet.

In addition, these inks need to dry quickly, be capable of flowing or remaining immobile in the vicinity of the nozzle without blocking it, with great stability of orientation of the jet while enabling easy cleaning of the printing head.

The ingredients that make up present inks, for ink jet of continuous deflected ink jet type, are organic or mineral products; they are colouring materials, such as dyes or pigments, resins or binders, in one or more solvent(s) more or less volatile or in water, optionally one or more salt(s) providing conductivity, as well as various additives.

The ingredients that make up present inks for drop on demand (DOD) type ink jet are also organic or mineral products; dyes or pigments, resins or binders, in one or more solvent(s), more or less volatile, or in water, in proportions other than those of inks for continuous deflected ink jet, but without the necessity of electrical conductivity.

In the case of inks for "hot melt" ink jet, the inks do not contain solvents liquid at ambient temperature but organic products liquid at the projection temperature already specified above, such as waxes and resins of low molecular weight. These waxes and resins of low molecular weight are generally selected so that the viscosity of the ink at the projection temperature is from 2 to 25 mPa·s.

The solvent of inks for ink jet, with the exception of inks for "hot melt" ink jet, consists (is constituted) most frequently of a mixture comprising, on the one hand, a majority quantity of volatile and not very viscous solvents, in order to enable the very rapid drying of the markings and to adjust the viscosity to their desired value, for example from 1 to 10 mPa·s and, on the other hand, more viscous and less volatile solvents, with slower drying, in a lesser quantity, to avoid the drying of the ink in the nozzle during stoppage phases of the printing device (see patents or patent applications U.S. Pat. No. 4,155,767, WO-A-92 14794, WO-A-92 14795 and U.S. Pat. No. 4,260,531).

The most often used volatile solvents are alcohols, ketones or esters of low molecular weight, as is indicated in patents U.S. Pat. No. 4,567,213, and U.S. Pat. No. 5,637,139. Among these solvents may be cited essentially methanol, ethanol, 1- and 2-propanol, acetone, methyl ethyl ketone ("MEK"), methyl isobutyl ketone, ethyl acetate, and tetrahydrofurane.

The additives comprise:
plastifiers that soften the dry ink film, and which are able to improve the adherence and the cohesion of the ink on the marked support.
dispersants that enable the dispersion of pigments. Such dispersants stabilise the pigments by steric effect and/or by electrostatic effect depending on whether they are ionisable or not, and depending on the polarity of the solvent.
agents that inhibit corrosion induced by certain salts, such as the chlorides that provide conductivity (see documents EP-A-0 510 752, U.S. Pat. No. 5,102,458).
additives that protect the ink against proliferations of bacteria and other micro-organisms: these include biocides, bactericides, fungicides and others, particularly useful in inks containing water.
pH regulating buffers (see EP-A-0 735 120).
anti-foaming agents.

Inks for ink jet may also comprise surfactants or surface active agents that modify the wettability or penetrability of the ink (cf. U.S. Pat. No. 5,395,431), in particular those that modify or regulate the static or dynamic superficial tension such as Fluorad® FC 430 of the firm 3M. Such products regularise the size of the impacts of the drops. Thanks to them, the impacts of the drops all have the same diameter whatever the nature, the cleanliness or the regularity of the support.

Additives also comprise, in the case of inks for continuous deflected ink jet printing, optionally one or more conductivity salts.

The optional conductivity salt(s) provide to the ink the conductivity necessary for electrostatic deflection. Reference may be made in this respect to the document U.S. Pat. No. 4,465,800. However, it may be noted that in certain cases also the dyes already provide sufficient conductivity to the ink so that there is no need to add a conductivity salt.

Colouring materials are called "dyes or pigments", depending on whether they are respectively soluble or insoluble in the solvent used.

Pigments, by nature insoluble, are thus dispersed and may be opaque or not. They provide to the ink its colour, its opacity, or particular optical properties, such as fluorescence (see patents or patent applications U.S. Pat. No. 4,153,593, U.S. Pat. No. 4,756,758, U.S. Pat. No. 4,880,465, EP-A-0 289 141, U.S. Pat. No. 5,395,432, GB-A-2 298 713). In certain cases, the dyes also provide for their part sufficient conductivity to the ink so that there is no need to add a conductivity salt. The dyes known under the denomination C.I. Solvent Black 27, 29, 35 and 45 are in this case.

The binder(s) or resin(s) is (are) generally for the most part one (several) solid and polymeric compound(s) and their choice is dictated by their solubility in the selected solvents, by their compatibility with the dyes and the other additives, their ability to enable a good electrostatic charge of the drops, but also as a function of the properties that they provide to the ink film, once dry (see patents or patent applications U.S. Pat. No. 4,834,799, GB-A-2 286 402, U.S. Pat. No. 5,594,044, U.S. Pat. No. 5,316,575, WO-A-96/23844, WO-A-95/29 287).

Their primary function is to provide to the ink adherence on the maximum of supports or on specific supports, for example non-porous. They also make it possible to give to the ink the appropriate viscosity for the formation of drops from the jet and they provide to the obtained marking the main part of its properties of resistance to physical and/or chemical aggressions, such as resistance to rubbing and more generally to abrasion.

The polymers used with the organic solvents are synthetic or natural, they may be either linear polymers, such as resins of rosin, shellac, resins of acrylic, methacrylic, styrenic, vinylic, cellulosic, and phenolic type, polyamides, polyurethanes, melamines, or else polyesters, or branched polymers such as dendrimers (see U.S. Pat. No. 6,221,933).

Obviously lowly cross-linked polymers cannot be used because they give rise to gels and not solutions.

Completely cross-linked polymers such as rubbers are intrinsically insoluble in solvents, and at best swell in solvents. On the other hand, pre-polymers cross-linkable by radiation, for example ultraviolet or electron beams, are used and are subjected to cross-linking after deposition on the support.

For formulations in aqueous phase, the polymers are either soluble linear polymers, or dispersions also known as latexes. The polymers of these dispersions may be linear or cross-linkable during drying.

The polymers or resins used in inks that can be projected by jet are generally polymers of relatively low molecular weight for two main reasons:
    if the molecular weights of the polymers or resins are too high, the viscosity provided by these polymers or resins is very high and their quality is very low, and particularly too low to coat correctly the colouring materials of the inks. This is true for all ink jet technologies.
    if the molecular weights of the polymers or resins are too high, the electrostatic charges of the drops are not stable and the printing is of poor quality, or even impossible, because the separation of the drops at the time they are charged is not facilitated and instable. This is true for ink jet of continuous deflected ink jet type.

Inks known as "hot melt" generally have very low abrasion resistance, due to the extreme lowness of the molecular weights of the resins that can be used. In fact, without solvent, it is only possible to obtain low viscosity by using ingredients of very low molecular weight and having a sharp, defined melting point, and above ambient temperature. Consequently, the films of these inks are rather thick, compared to inks with solvents, and very rigid at ambient temperature and even more so at low temperature.

Furthermore, it is known in a general manner that the marking of flexible or even very flexible supports, substrates, such as substrates or supports, and particularly films, made of rubber, or substrates or supports, and particularly films made of plastic such as plastified PVC or PVDC (polyvinylidene chloride), poses a problem that is particularly difficult to solve.

The adherence of inks on such supports is difficult because the ink has to be as flexible as the support in order to adhere thereto. The limitation of the molecular weights of the polymers used as binder for the inks does not make it possible to plastify them without risking making them sticky and very poorly resistant to rubbing or to abrasion.

The resistance of markings obtained by the ink jet printing technique to a steam sterilisation technique is also an important constraint for markings which are appended on foodstuff packaging that needs to be sterilised.

In particular, PVDC packaging is increasingly used, due to the ability of this polymer to be very flexible, and to withstand steam sterilisation and on account of its exceptional properties of oxygen and water vapour impermeability.

In addition, perfect adherence of the marking will only be obtained if the binder of the ink and the support are perfectly compatible and if the solvent of the ink is capable of dissolving them or compatibilising them.

There thus exists, in light of the preceding, a need for an ink composition that can be projected by all technologies of depositing low viscosity ink, and which enables the marking of all flexible, or even very flexible, supports or substrates, such as plastic films, particularly supports or substrates, such as films, made of a polymer of vinylic type, at ambient temperature, and even more at the steam sterilisation temperature, in other words at a temperature generally of 90° C. to 135° C.

An unsatisfied need still exists for an ink composition suitable for ink jet printing, whether by drop on demand or by continuous ink jet, which gives markings having good adherence and good resistance to chemical aggressions, particularly good resistance to water, good resistance to abrasion, folding, rubbing or else steam sterilisation, in particular on flexible or very flexible supports, such as plastic films particularly plastic films made of PVC or PVDC or rubber supports.

This ink composition must, further, have all the properties normally required of inks for ink jet printers, for example for inks for printers using the continuous ink jet technique: viscosity, resistivity, etc. The ink must have at one and the same time the property of drying quickly, to not obstruct the nozzles and to enable a rapid start up even after a long stoppage.

The ink must, in addition, enable marking at high speed of objects of all kinds, even slightly porous, while always giving printing or marking of excellent quality and regularities.

The goal of the invention is to provide an ink composition for liquid jet printing that meets among other things the needs and requirements listed above.

The goal of the invention is also to provide an ink composition for liquid jet printing that does not have the drawbacks, defects, limitations and disadvantages of the compositions of the prior art and which provides a solution to the problems of the compositions of the prior art.

This goal, and yet others, are achieved according to the invention by a non-aqueous ink composition for liquid ink jet printing comprising:
- a vehicle comprising one or more organic solvent(s) liquid at ambient temperature, or one or more organic compound(s) solid at ambient temperature and liquid at the projection temperature of the ink composition;
- one or more dye(s) and/or pigment(s);
- a binder, comprising at least one binding resin consisting of a copolymer of vinylidene chloride and of at least one other monomer, in solution at ambient temperature in the organic solvent(s), or in solution at the projection temperature in the organic compound(s).

"Other monomer" is obviously taken to mean that this monomer is different from the monomer of vinylidene chloride.

Said binding resin constituted of a copolymer of vinylidene chloride and of at least one other monomer is generally soluble in all proportions at ambient temperature in the organic solvent(s), or soluble in all proportions at the projection temperature in the organic compound(s).

"Ambient temperature" is generally taken to mean a temperature of 5° C. to 30° C., preferably of 10° C. to 25° C., even more preferably of 15° C. to 24° C., and better still of 20° C. to 23° C.

"Projection temperature", for "HM" type inks, is generally taken to mean a temperature of 60° C. to 130° C.

It is understood that the ink is liquid at atmospheric pressure.

Advantageously, said at least one other monomer is a monomer comprising a single ethylenically unsaturated carbon-carbon double bond.

Preferably, said at least one monomer comprising a single ethylenically unsaturated carbon-carbon double bond is selected from vinyl chloride, alkyl (for example of 1 to 10 C) acrylates and alkyl (for example of 1 to 10 C) methacrylates, acrylonitrile, methacrylonitrile, acrylic acid, methacrylic acid, maleic acid, itaconic acid, and mixtures thereof.

As an example of binding resin constituted of a copolymer of vinylidene chloride and of at least one other monomer may be cited the resin IXAN® SGA-1, which is a soluble PVDC resin available from the firm SolVin (Solvay) of Brussels, Belgium.

This resin is soluble in numerous common solvents including esters and ketones.

The ink composition according to the invention differs fundamentally from ink compositions for liquid ink jet printing of the prior art in that it is a non-aqueous composition and in that it uses a specific binder comprising at least one specific binding resin of copolymer of vinylidene chloride type.

No document of the prior art describes or suggests an ink composition for liquid ink jet printing having all of the specific characteristics of the ink composition according to the invention.

In particular, no document of the prior art describes or suggests the use of a copolymer of vinylidene chloride in the binder of a non-aqueous ink composition for liquid ink jet printing.

The invention is particularly based on the surprising finding that copolymers of vinylidene chloride may be used as binders in inks for ink jet printing, are soluble in the organic solvents or the organic compounds that form the vehicle of these inks, and, in a surprising manner, improve the cohesion, the flexibility, the resistance to abrasion or to sterilisation of markings or prints made with these inks on flexible or rubbery supports.

This finding is all the more surprising given that homopolymers of vinylidene chloride, although structurally similar, are not, for their part, soluble, due to their very high crystallinity, in the common solvents that can be used for the formulation of inks for ink jet.

Homopolymers of vinylidene chloride thus cannot be used as binders in inks for ink jet printing, and provide all the effects and advantages of copolymers of vinylidene chloride used in the binder of ink compositions according to the invention.

In fact, vinylidene chloride may be copolymerised with other monomers, particularly monomers having an ethylenic double bond such as vinyl chloride, alkyl acrylates or alkyl methacrylates, acrylonitrile, methacrylonitrile, vinyl acetate, acrylic or methacrylic acids, or else itaconic acid. Copolymerisation renders these copolymers amorphous and thus more soluble in organic solvents. On the other hand, the reduction of crystallinity increases the permeability to gases of films based on these copolymers compared to the films of homopolymers.

In this respect, the following document may particularly be cited

Kirk-Othmer: *Encyclopedia of Chemical Technology*, fourth edition, vol. 24 (New York: John Wiley & sons Inc. 1997, pp. 882-923).

Copolymers of vinylidene chloride are proposed by their manufacturers to provide adherence between plastic films and aluminium films in order to form complex films, or else to constitute a superficial layer in order to increase the impermeability to gases such as oxygen and water vapour of plastic or cellulosic films.

Some homopolymers or copolymers of vinylidene chloride are manufactured in the form of aqueous suspensions and used to increase the oxygen and water vapour impermeability of films.

According to the invention, it has now been demonstrated, in a totally surprising manner, that certain copolymers of vinylidene chloride are perfectly suited to projection by jet in these non-aqueous ink compositions.

It did not ensue from an obvious manner from known applications of such copolymers of vinylidene chloride solubilised in organic solvents that they can be used as binders for inks able to be projected, sprayed, by jet.

In particular, it was absolutely not obvious and predictable with regard to the prior art that formation and electrical charging of the drops during the projection by continuous ink jet of an ink composition according to the invention was going to take place ideally and lead to printings of perfect quality.

Thus:

Very many document exist that describe inks that can be projected by ink jet based on aqueous dispersions of polyvinylidene chloride or of copolymers thereof, such as the patents U.S. Pat. No. 7,897,655, U.S. Pat. No. 7,638,561, U.S. Pat. No. 7,598,301, U.S. Pat. No. 7,132,464, U.S. Pat.

No. 5,954,866, U.S. Pat. No. 4,471,079. These ink compositions are fundamentally different from the ink compositions according to the invention, because they are aqueous ink compositions and not non-aqueous ink compositions like the ink compositions according to the invention.

The document U.S. Pat. No. 5,908,495 describes ink compositions for ink jet printing comprising a dye, a liquid vehicle, a photo-reactor, and optionally a support ("carrier"). Among the considerable number of thermosetting and thermoplastic polymers that may constitute the support, polyvinylidene chloride (homopolymer) is incidentally cited. Copolymers of vinylidene chloride are neither mentioned nor suggested in this document.

The patents cited above thus do not describe or suggest the use of copolymers of vinylidene chloride in solution in a suitable solvent organic, for a use in inks for ink jet printing.

These patents, but also other documents of the prior art, among which the technical data sheets of the manufacturers of copolymers of vinylidene chloride, do not disclose any example of embodiment comprising copolymers of vinylidene chloride in solution in an organic solvent.

In particular, these patents do not mention or suggest the use of such copolymers of vinylidene chloride in the binder of non-aqueous ink compositions for ink jet printing, whatever the type of ink jet printing, namely "DOD", "CIJ" or "HM".

There is no indication in these documents that would have made it possible to suppose that unexpected, advantageous properties could be obtained, by dissolving such copolymers of vinylidene chloride to formulate inks for ink jet printing, whether in organic solvents liquid at ambient temperature or organic products liquid at the projection temperature such as the organic products of the formulations of inks known as "hot melt".

Unlike compositions of the prior art as described above, the ink composition according to the invention contains as binding resin copolymers of vinylidene chloride in solution in the organic solvent of the ink composition.

In conclusion, the ink compositions according to the invention do not have the drawbacks of compositions of the prior art and provide a solution to the problems of the compositions of the prior art.

The ink composition according to the invention is a non-aqueous composition, which generally means that the ink composition according to the invention comprises a very low proportion of water.

Thus, the ink composition according to the invention generally comprises less than 0.5% by weight of water, preferably less than 0.1% by weight of water, even more preferably less than 0.05% by weight of water with respect to the total weight of the ink; better still, the vehicle, for example the solvent, and the ink composition may be considered as being essentially exempt, free of water (0% by weight of water).

Since the water introduced occurs as an impurity in the various components of the ink, the higher the degree of purity of the components selected, the lower the water content. In fact, it may be said that the ink according to the invention does not contain added water but only the water introduced as an impurity by the different constituents of the ink.

In the same way, the vehicle of the ink composition according to the invention is generally non-aqueous in the sense given above, in other words said vehicle is essentially or exclusively organic and it only comprises organic solvents or organic compounds.

This absence or quasi-absence of water is also one of the characteristics that differentiates the ink composition according to the invention from the compositions of the prior art in which copolymers of vinylidene chloride generally remain in the aqueous medium in which they have been prepared and are not dispersed in a solvent essentially or exclusively organic as in the ink composition according to the invention.

The binder of the ink composition according to the invention, preferably constituted (consisting) of at least one binding resin constituted (consisting) of a copolymer of vinylidene chloride, generally represents 0.1 to 30% by weight, preferably 1 to 25% by weight, even more preferably 3 to 20% by weight, of the total weight of the ink composition.

Advantageously, the binder may comprise at least 10% by weight, preferably at least 50% by weight of said at least one binding resin constituted (consisting) of a copolymer of vinylidene chloride and of at least one other monomer.

Preferably, the binder may be constituted (may consist) (100% by weight) of said at least one binding resin constituted (consisting) of a copolymer of vinylidene chloride and of at least one other monomer.

Apart from the at least one binding resin constituted (consisting) of a copolymer of vinylidene chloride, and in the case where the binder is not uniquely constituted (does not uniquely consist) of said binding resin, the binder of the ink composition according to the invention may further comprise one or more other binding resin(s) generally selected from resins soluble at ambient temperature in the organic solvent(s) or soluble at the projection temperature in the organic compound(s) of the ink composition.

"Resins soluble at ambient temperature in the organic solvent(s) or soluble at the projection temperature in the organic compound(s) of the ink composition" is generally taken to mean that said resins are soluble at ambient temperature in all proportions in this or these organic solvent(s), or soluble at the projection temperature in all proportions in this or these organic compound(s).

This or these other binding resin(s) may be selected for example from resins soluble in ketonic solvents such as polyacrylates, polymethacrylates, polystyrenes and copolymers thereof, epoxy resins, epoxy phenolic resins, melamines, and rosin derivatives.

The vehicle represents generally at least 20% by weight of the total weight of the ink composition, preferably from 30 to 90% by weight, more preferably from 60 to 80% by weight, of the total weight of the ink composition according to the invention.

As has already been indicated above, the vehicle comprises, preferably is constituted of (consists of), one or more organic solvent(s) liquid at ambient temperature, or of one or more organic compound(s) solid at ambient temperature and liquid at the projection temperature.

The organic solvent(s) of the ink composition according to the invention may be any solvent capable of dissolving the copolymers of vinylidene chloride according to the invention.

The said organic solvent(s) advantageously comprise(s) a majority (predominant) proportion by weight, compared to the total weight of the vehicle (50% by weight of the total weight of the vehicle or more, or even up to 100% by weight of the total weight of the vehicle), of one or more volatile organic solvent(s), and optionally a minority proportion by weight, compared to the total weight of the vehicle, of one or more non-volatile organic solvent(s).

The vehicle preferably consists of one or more volatile organic solvent(s).

The expression "volatile organic solvent" is generally understood to mean that this solvent has a speed of evaporation of more than 0.5 (preferably of more than 1.5, more preferably of more than 2) on the scale in which n-butyl acetate has a speed of evaporation equal to 1. In other words (see below), this solvent has a volatility index according to NF T30-301 standard of more than 0.5, preferably of more than 1.5, more preferably of more than 2.

The said organic solvent(s) that is(are) part of the vehicle is/are chosen, for example, from the alcohols, in particular the alcohols of low molecular weight, for example the aliphatic alcohols such as ethanol; the ketones, preferably of low molecular weight; the ethers of alkylene glycols; the esters of alkylene glycols and the esters of ethers of alkylene glycols, such as the acetates; dimethyl formamide; N-methyl pyrrolidone; the acetals; the esters; the linear or cyclic ethers; the aliphatic hydrocarbons, whether cyclic or linear; the aromatic hydrocarbons; and the carbonates such as propylene carbonate, ethylene carbonate and the dimethyl- and diethyl-carbonates; and mixtures thereof.

This or these solvent(s) preferably has/have the property of dissolving the other ingredients of the ink, the dyestuffs, the additives, etc.

The alcohols will preferably be chosen from among the linear or branched aliphatic alcohols of 1 to 8 carbon atoms, such as methanol, ethanol, propanol-1, propanol-2, n-butanol, butanol-2, tert-butanol, etc.

The ketones will preferably be chosen from among the ketones with 3 to 10 carbon atoms, such as acetone, butanone (methyl-ethyl-ketone), pentanone-2 (methyl-propyl-ketone), methyl-3 butanone-2 (methyl-isopropyl ketone) and methyl-4 pentanone-2 (methyl-isobutyl-ketone).

The ethers of alkylene glycols are preferably chosen from among the mono-alkyl ethers (C1 to C6 alkyl group) or dialkyl ethers (C1 to C6 alkyl groups) of alkylene glycol comprising 1 to 10 carbon atoms in the alkylene chain; these are preferably ethers of ethylene glycol or propylene glycol, such as methoxy-propanol.

The esters of alkylene glycols and the esters of ethers of alkylene glycols are preferably chosen from among the esters of the latter with the saturated aliphatic, carboxylic acids with 1 to 6 carbon atoms, such as formic acid, acetic acid, propionic acid, butyric acid, valeric acid and caproic acid.

Methoxypropyl acetate, butyldiglycol acetate, etc., may for example be mentioned.

The esters are chosen, preferably, from among the esters of low molecular weight such as the formates, the acetates, the propionates or the butyrates of alcohols with 1 to 10 carbon atoms.

The acetals are preferably chosen from among the acetals of low molecular mass such as ethylal and methylal.

The ethers are preferably chosen from among the ethers of low molecular mass such as dioxolane or tetrahydrofuran.

Those skilled in the art will easily be able to identify from among these solvents those which are volatile and those which are non-volatile.

Preferably, the solvent(s) of the ink composition according to the invention may be selected from ketones, preferably, from aliphatic ketones of 3 to 10 carbon atoms, such as acetone, butanone (methyl ethyl ketone), 2-pentanone (methyl propyl ketone), 3-methyl-2-butanone (methyl isopropyl ketone) and 4-methyl-2-pentanone (methyl isobutyl ketone); cyclic ketones such as cyclohexanone; and mixtures thereof.

A preferred vehicle according to the invention generally comprises a majority proportion, amount, by weight (50% by weight of the total weight of the vehicle or more) compared to the total weight of the vehicle, of one or more ketone(s), this or these ketone(s) being selected preferably from among the aliphatic ketones with 3 to 10 C such as acetone, butanone (methyl ethyl ketone or MEK), 2-pentanone (methyl propyl ketone or MPK), 3-methyl-2-butanone (methyl isopropyl ketone or MIK) and 4-methyl-2-pentanone (methyl isobutyl ketone). Preferably, the vehicle is constituted of (consists of) one or more ketone(s), said ketone(s) being selected preferably from the ketones cited above.

A vehicle preferred above all, comprises a majority amount by weight of the total weight of the vehicle, of MEK, and preferably consists of 100% of methyl ethyl ketone (MEK).

In the preferred vehicle, one or more organic solvent(s) other than ketone(s) such as MEK, may be added in the vehicle in a minority total proportion, amount by weight (less than 50% by weight), preferably from 5 to 25% by weight with respect to the total weight of the vehicle, in order to optimise the properties of the inks. These minority solvents may be selected from esters, ethers of ethylene glycol or propylene glycol, and acetals.

Generally, the vehicle of the ink composition according to the invention (or more precisely the one or more organic solvent(s) liquid at ambient temperature of said vehicle) has a volatility index (Ve) of evaporation index according to NF T30-301 standard (relative to n-butyl acetate) of more than 0.5, preferably of more than 1.5, and more preferably of more than 2.

MEK has a Ve of 3.7 and ethanol has a Ve of 2.

NF T30-301 standard defines the volatility (or evaporation) index of a solvent as follows:

The volatility index (Ve) is the quotient of the evaporation time of n-butyl acetate taken as standard solvent, divided by the evaporation time of the tested solvent, said times being measured under the conditions set out in said NF T30-301 standard.

Thus, $$Ve \text{ (relative to n-butyl acetate)} = \frac{\text{evaporation time of n-butyl acetate}}{\text{evaporation time of the tested solvent}}.$$

In the case where the ink is a "HM" ink, the organic products of the vehicle, solid at ambient temperature and liquid at the projection temperature, may be selected from resins derived from rosin, hydrocarbon resins, polyethylene waxes, natural or synthetic waxes, esters and polyesters, acids, ketones or fatty alcohols, amides and polyamides, polyethylene glycols and others known to those skilled in the art.

The ink composition according to the invention also contains colouring materials such as dyes and pigments.

The dye(s) and/or pigment(s) may be selected from all the dyes or pigments suitable for the desired use, known to the man skilled in the art, some of these pigments or dyes have already been cited above.

The dyes and pigments are generally selected from dyes and pigments known under the denomination of "C.I. Solvent Dyes" and "C.I. Pigments".

As examples of the most common pigments and dyes may be cited C.I. Solvent Black 3, 7, 27, 28, 29, 35, 48, 49, C.I. Solvent Blue 38, 44, 45, 70, 79, 98, 100, 129, C.I. Solvent Red 8, 49, 68, 89, 124, 160, 164, C.I. Solvent Yellow 83:1, 126, 146, 162, C.I. Solvent Green 5, C.I. Solvent Orange 97, C.I. Solvent Brown 20, 52, C.I. Solvent Violet 9, dispersions of Pigment Blue 15:1, 15:3, 60, of Pigment Green 7, of Pigment Black 7, of Pigment Red 48:2, 144, 149, 166, 185, 202, 208, 214, 254, of Pigment Violet 19, 23, of Pigment Yellow 17, 83, 93, 139, 151, 155, 180, 191, of Pigment Brown 23, 25, 41, or of Pigment White 6.

The preferred dyes are C.I. Solvent Black 27 and C.I. Solvent Black 29.

The preferred pigments are Pigment White 6, Pigment Black 7, Pigment Blue 60, Pigment Red 202 and Pigment Green 7.

The total quantity of dye(s) and/or of pigment(s) is generally 0.05 to 25% by weight, preferably, 1 to 20%, even more preferably 3 to 10% of the total weight of the composition.

Preferably a dye will be selected for which the solubility in water is the lowest, which is insoluble in water.

"Dye insoluble in water" is generally taken to mean a dye, which, added in an amount of 1% by weight, to demineralised water, does not cause any coloration of the water in a manner visible to the naked eye.

The ink composition may, further, comprise one or more plastifier(s) (of the resin(s) or polymer(s) of the binder) selected, for example, from plastifiers known to the man skilled in the art and selected as a function of the binder used comprising a copolymer of vinylidene chloride and optionally one or more other polymer(s) and/or resin(s). As plastifier, for example, thermoplastic polyurethanes, phthalates, adipates, citrates and esters of citric acid, alkyl phosphates, glycerol, lactic acid, oleic acid, polypropylene glycol, fatty acid triglycerides, levulinic acid; and mixtures thereof may be cited.

The plastifier(s) is (are) generally present in an amount of at least 0.05%, preferably 0.1 to 20% by weight, of the total weight of the ink composition.

The composition according to the invention, if it has to be able to be sprayed by continuous deflected ink jet, may further optionally comprise at least one conductivity salt, unless another ingredient of the ink such as a dye, pigment, or other, is itself an ionisable compound such as a salt being able to provide conductivity when it is dissociated, and gives sufficient conductivity to the ink so as not to have need to add an actual conductivity salt, this is particularly the case of compounds known under the denomination "C.I. Solvent Black 27, 29, 35 and 45", already cited.

In fact, the ink according to the invention, when it has to be applicable by continuous deflected ink jet, needs to have sufficient electrical conductivity generally greater than or equal to 5 µS/cm at 20° C., preferably greater than or equal to 300 µS/cm at 20° C., even more preferably greater than or equal to 500 µS/cm at 20° C.

The conductivity of the ink according to the invention may for example be 5 to 5000 µS/cm at 20° C., particularly 500 to 2000 µS/cm at 20° C.

However, it will sometimes be necessary to include, in the ink composition, an actual conductivity salt, different from the ionisable compounds, such as the dyes, pigments and other ingredients cited above.

"Conductivity salt" is generally taken to mean a salt that provides electrical conductivity to the ink composition.

This conductivity salt may thus be selected from salts of alkaline metals such as lithium, sodium, potassium, salts of alkaline earth metals such as magnesium and calcium, and simple or quaternary ammonium salts; said salts being in the form of halogenides (chlorides, bromides, iodides, fluorides), perchlorates, nitrates, thiocyanates, formiates, acetates, sulphates, propionates, trifluoroacetates, triflates (trifluoromethane sulphonates), hexafluorophosphates, hexafluoroantimonates, tetrafluoroborates, picrates, carboxylates and sulphonates, etc.

Due to the fact that the markings obtained with the ink composition generally need to be resistant to water, this or these conductivity salt(s) will generally be selected from those that are insoluble in water (in other words, generally, for which the water solubility is below 0.5% by weight), such as fatty chain quaternary ammoniums and hexafluorophosphates or hexafluroantimonates.

At least one conductivity salt will thus be present, if necessary, in the ink composition so as to communicate to the ink the above conductivity: preferably, the amount thereof is 0.1 to 20% by weight, more preferably 0.1 to 10% by weight and even better 0.1 to 5% by weight, of the total weight of the ink composition.

The composition according to the invention may, further, comprise one or more additive(s) selected from compounds that improve the solubility of some of its components, the printing quality, the adherence, or even the control of the wetting of the ink on different supports.

The additive(s) could be selected, for example, from anti-foaming agents, chemical stabilisers, UV stabilisers; surface active agents, such as Fluorad® FC430, BYK UV-3500, agents inhibiting corrosion by salts, bactericides, fungicides and biocides, pH regulating buffers, etc.

The additive(s) is (are) used at very low doses, in general less than or equal to 5% and sometimes as low as 0.01%, depending on whether they are anti-foaming agents, stabilisers or surfactants.

The subject matter of the invention is also a method for marking a substrate, support or object, for example, a porous or non-porous, substrate, support or object by projection, spraying onto said substrate, support or object of an ink by a liquid ink jet printing technique, the projected, sprayed, ink being an ink composition according to the invention, as described above.

The marking is carried out either by the continuous deflected ink jet technique, or by the "drop on demand" technique, including by the "hot melt" ink jet technique.

The subject matter of the invention is also a substrate, support or object, for example, a porous or non-porous, substrate, support or object provided with a marking obtained by drying and/or absorption (in the substrate or support) of the ink composition, as described above.

Said marking comprises essentially the dye or pigment of the ink as well as the binder, and it is obtained by evaporation and/or absorption in the substrate, of essentially the totality of the other constituents of the ink, such as the vehicle.

This substrate may be made of metal, for example, of aluminium, of steel (drinks cans); glass (glass bottles); of ceramic; of a material containing cellulose such as cellophane, paper, optionally coated or glazed, cardboard or wood; of an organic polymer, particularly of a thermoplastic polymer ("plastic") particularly in the form of a film, selected for example from PVDC, PVC, polyesters, PET, polyolefins, such as polyethylenes (PE), polypropylenes (PP); poly(methylmethacrylate) PMMA also known as "Plexiglas"; of fabric; of natural or synthetic rubber; or made of any other non-porous or porous substance; or made of a composite of several of the preceding materials.

The substrate is particularly a flexible or very flexible substrate such as a plastic film, preferably thin, made of cellophane, polyethylene or polypropylene, particularly bi-oriented polypropylene, made of poly(vinylchloride) (PVC) particularly plastified or made of poly(vinylidene chloride) (PVDC); or a substrate made of rubber.

Markings, printings of excellent quality are obtained on all the substrates and in particular on flexible or very flexible substrates. These markings, printings are very resistant to rubbing and to steam sterilisation even on these flexible or even very flexible supports.

The invention will be better understood on reading the following description of embodiments of the invention, given by way of illustrative and non-limiting examples.

COMPARATIVE EXAMPLE

In this example, a comparative ink composition has been prepared, not complying with the invention, which does not contain as binder a copolymer of vinylidene chloride, but vinylic and acrylics resins that are recommended for the formulation of inks for printing on substrates of PVDC type. The adherence conferred by these resins is thus among the best for such applications.

The ink composition comprises, apart from said vinylic and acrylic resins, other ingredients, such as dyes, pigments, and other additives mentioned in Table I, in the proportions mentioned in Table I.

Examples 1 to 7

In all these examples, ink compositions according to the invention are prepared which all contain as binder a copolymer of vinylidene chloride.

These ink compositions comprise, apart from the copolymer of vinylidene chloride, other ingredients mentioned in Table I, such as dyes, pigments, and other additives, and optionally another resin different from the copolymer of vinylidene chloride, in the proportions mentioned in Table I.

The resin Vinnol E15/45M is a copolymer of vinyl chloride and vinyl acetate manufactured by the firm Wacker.

The ink compositions according to Table I have been prepared by mixing the different resins, dyes and other additives in the solvent up to complete dissolution.

All of these formulations have been tested in Markem-Imaje® printers of continuous jet type, and made it possible to obtain prints of excellent quality.

In addition, markings, printings have been made with the ink compositions No 3 and No 7 on supports made of plastified PVDC, and subjected to a sterilisation in autoclave pressurised for 30 minutes at 12° C., and have not undergone any alteration.

In the same conditions of sterilisation but placing in contact the PVDC support printed with these inks with the same unprinted support, a more important transfer of ink onto the non-printed support with the comparative ink than with the inks according to the invention may be observed.

The invention claimed is:

1. Non-aqueous ink composition for liquid ink jet printing comprising:
    a vehicle comprising one or more organic solvent(s), liquid at ambient temperature, wherein the vehicle comprises a majority proportion by weight of the total weight of the vehicle of one or more ketones;
    one or more dye(s) and/or pigment(s) present in an amount from 0.05% to 25% by weight of dye(s) and/or pigment(s) with respect to the total weight of the ink composition;
    a binder, comprising at least one binding resin consisting of a copolymer of vinylidene chloride and of at least one other monomer, in solution at ambient temperature in the organic solvent(s).

TABLE I

INK COMPOSITIONS

| Constituents (percentages by weight) | Comparative example | N°1 | N°2 | N°3 | N°4 | N°5 | N°6 | N°7 |
|---|---|---|---|---|---|---|---|---|
| Methyl ethyl ketone | 60.55 | 60.5 | 83 | 88.8 | 87.5 | 87.5 | 80 | 61.3 |
| Ethyl acetate | 0.95 | | | | | | | 0.9 |
| IXAN® SGA-1 | | 2 | 12 | 7.2 | 7.5 | 7.5 | 10 | 5 |
| Acrylic resin (Neocryl B813) | 2 | | | | | | | |
| Vinylic resin (Vinnol E15/45M) | 6.5 | 5.9 | | | | | | 2.5 |
| Solvent Black 29 (Orasol® black RLI) | | | 5 | | | | | |
| Dispersion of C.I. Pigment Blue 60 at 60% in a vinylic resin | | | | 4 | | | | |
| Dispersion of C.I. Pigment Red 202 at 70% in a vinylic resin | | | | | | 5 | | |
| Dispersion of C.I. Pigment Yellow 83 at 70% in a vinylic resin | | | | | 5 | | | |
| Dispersion of C.I. Pigment Black 7 at 8.8% in methyl ethyl ketone | 29.1 | 30.7 | | | | | | 29.3 |
| Dispersion of C.I. Pigment White 6 at 75% in an acrylic resin | | | | | | | 10 | |
| Tetrabutylammonium hexafluorophosphate | 0.9 | 0.9 | | 1 | 1 | 1 | 1 | 1 |
| Surfactant Byk UV-3500 | | | | 0.1 | 0.1 | 0.1 | 0.1 | |
| Viscosity (mPa · s) | 3.75 | 4.15 | 5.5 | 3.71 | 4.13 | 4.75 | 6.5 | 5.2 |
| Conductivity (µS/cm) | 960 | 957 | 1020 | 958 | 942 | 963 | 930 | 910 |
| Particle size (Z-Average in nm) | 132 | NT* | NA* | 83.2 | 383 | 141 | 396 | 135 |

*NT: Not Tested
*NA: Not Applicable

The resin IXAN® SGA-1 is a soluble PVDC resin available from the firm SolVin (Solvay) of Brussels, Belgium.

The resin Neocryl® B813 is a copolymer of ethyl methacrylate and of an acid monomer giving an acid number of 10 mg KOH/g manufactured by the firm DSM-Neoresin. Its Tg (glass transition temperature) is 64° C.

2. Ink composition according to claim 1, in which said at least one other monomer is a monomer comprising a single ethylenically unsaturated carbon-carbon double bond.

3. Ink composition according to claim 2, in which said at least one monomer comprising a single ethylenically unsaturated carbon-carbon double bond is selected from vinyl chloride, alkyl acrylates and alkyl methacrylates, acrylonitrile, methacrylonitrile, acrylic acid, methacrylic acid, maleic acid, itaconic acid, and mixtures thereof.

4. Ink composition according to claim 1, in which the binder represents 0.1 to 30% by weight of the total weight of the ink composition.

5. Ink composition according claim 1, in which the binder comprises at least 10% by weight of said at least one binding resin consisting of a copolymer of vinylidene chloride and of at least one other monomer.

6. Ink composition according to claim 1, in which apart from the at least one binding resin consisting of a copolymer of vinylidene chloride, the binder further comprises one or more other binding resin(s).

7. Ink composition according to claim 1, in which the vehicle represents at least 20% by weight of the total weight of the ink composition.

8. Ink composition according to claim 1, in which the at least one ketone is selected from aliphatic ketones of 3 to 10 carbon atoms; cyclic ketones; and mixtures thereof.

9. Ink composition according to claim 1, in which the vehicle comprises a majority amount by weight of the total weight of the vehicle of methyl ethyl ketone.

10. Ink composition according to claim 1, in which one or more organic solvent(s) other than ketones is (are) added in the vehicle in a minority proportion by weight, with respect to the total weight of the vehicle.

11. Ink composition according claim 1, in which said dye(s) and/or pigment(s) is (are) selected from dyes and pigments known under the denomination "C.I. Solvent Dyes" and "C.I. Pigments".

12. Ink composition according to claim 11, in which said "Solvent Dyes" are selected from C.I. Solvent Black 3, 7, 27, 28, 29, 35, 48, 49, C.I. Solvent Blue 38, 44, 45, 70, 79, 98, 100, 129, C.I. Solvent Red 8, 49, 68, 89, 124, 160, 164, C.I. Solvent Yellow 83:1, 126, 146, 162, C.I. Solvent Green 5, C.I. Solvent Orange 97, C.I. Solvent Brown 20, 52, and C.I. Solvent Violet 9.

13. Ink composition according to claim 11, in which said "C.I. Pigments" are selected from dispersions of Pigment Blue 15:1, 15:3, 60, of Pigment Green 7, of Pigment Black 7, of Pigment Red 48:2, 144, 149, 166, 185, 202, 208, 214, 254, of Pigment Violet 19, 23, of Pigment Yellow 17, 83, 93, 139, 151, 155, 180, 191, of Pigment Brown 23, 25, 41, or of Pigment White 6.

14. Ink composition according to claim 1, further comprising one or more plastifier(s) in an amount of at least 0.05% by weight of the total weight of the ink composition.

15. Ink composition according to claim 1, further comprising at least one conductivity salt in an amount of 0.1 to 20% by weight of the total weight of the ink composition.

16. Ink composition according to claim 15, in which said conductivity salt is selected from salts of alkaline metals, salts of alkaline earth metals, and simple or quaternary ammonium salts; said conductivity salts being in the form of halogenides, perchlorates, nitrates, thiocyanates, formiates, acetates, sulphates, propionates, trifluoroacetates, triflates (trifluoromethane sulphonates), hexafluorophosphates, hexafluoroantimonates, tetrafluoroborates, picrates, carboxylates and sulphonates.

17. Ink composition according to claim 1, which has a conductivity in the liquid state greater than or equal to 5 µS/cm at 20° C.

18. Ink composition according to claim 1, further comprising one or more additive(s) selected from anti-foaming agents; chemical stabilisers; UV stabilisers; surface active agents; agents inhibiting corrosion by salts; bactericides, fungicides and biocides; and pH regulating buffers.

19. Method for marking a substrate, support, or object by projection onto said substrate, support or object of an ink by a liquid ink jet printing technique, characterised in that the projected ink is an ink composition according to claim 1.

20. Substrate, support or object characterised in that it is provided with a marking obtained by drying and/or absorption of the ink composition according to claim 1.

21. Substrate, support or object according to claim 20, characterised in that the substrate is made of metal, of glass; of ceramic; of a material containing cellulose; of an organic polymer; of polymethylmethacrylate PMMA ("Plexiglas"); of fabric; of natural or synthetic rubber; or made of any other non-porous or porous substance; or made of a composite of several of the preceding materials.

22. Substrate according to claim 21, the substrate being flexible.

23. Ink composition according to claim 8, in which the aliphatic ketones of 3 to 10 carbon atoms are selected from acetone, butanone (methyl ethyl ketone), 2-pentanone (methyl propyl ketone), 3-methyl-2-butanone (methyl isopropyl ketone), 4-methyl-2-pentanone (methyl isobutyl ketone) and mixtures thereof.

24. Ink composition according to claim 8, in which the cyclic ketone is cyclohexanone.

25. Ink composition according to claim 1, in which the vehicle consists of one or more ketone(s).

26. Ink composition according to claim 1, in which the vehicle consists of methyl ethyl ketone (MEK).

27. Substrate, support or object according to claim 21, in which the metal is aluminium or steel.

28. Substrate, support or object according to claim 21, in which the material containing cellulose is selected from the group consisting of cellophane, paper, optionally coated or glazed, cardboard and wood.

29. Substrate, support or object according to claim 21, in which the organic polymer is a thermoplastic polymer ("plastic").

30. Substrate, support or object according to claim 29, in which the thermoplastic polymer is in the form of a film.

31. Substrate, support or object according to claim 29, in which the thermoplastic polymer is selected from the group consisting of PVDC, PVC, polyesters, PET, and polyolefins.

32. Substrate according to claim 22, in which the substrate is made of a material selected from the group consisting of cellophane, polyethylene, polypropylene, bi-oriented polypropylene, polyvinylchloride (PVC), plastified polyvinyl chloride, poly(vinylidene chloride) (PVDC), and rubber.

33. Ink composition according to claim 10, in which one or more organic solvent(s) other than ketones is (are) added in the vehicle in an amount of from 5 to 25%, with respect to the total weight of the vehicle.

* * * * *